US009021064B2

(12) United States Patent
Varmaraja et al.

(10) Patent No.: US 9,021,064 B2
(45) Date of Patent: Apr. 28, 2015

(54) WEB SERVICE ARCHITECTURE FOR PRODUCT CONFIGURATION

(75) Inventors: Muralidhara Varmaraja, Fremont, CA (US); Hang Lu, Foster City, CA (US); Ashish Singhal, Union City, CA (US); Eugene Chikovani, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 12/254,754

(22) Filed: Oct. 20, 2008

(65) Prior Publication Data

US 2009/0106402 A1 Apr. 23, 2009

Related U.S. Application Data

(60) Provisional application No. 60/981,446, filed on Oct. 19, 2007.

(51) Int. Cl.
*G06F 15/173* (2006.01)
*G06Q 30/06* (2012.01)

(52) U.S. Cl.
CPC ............ *G06Q 30/06* (2013.01); *G06Q 30/0601* (2013.01)

(58) Field of Classification Search
CPC .......................... G06Q 30/0601; G06Q 30/06
USPC .............. 709/720, 220, 226; 705/26
See application file for complete search history.

(56) References Cited

U.S. PATENT DOCUMENTS

| | | | |
|---|---|---|---|
| 5,717,866 A | 2/1998 | Naftzger | 705/14.38 |
| 5,774,670 A | 6/1998 | Montulli | 709/227 |
| 5,926,525 A | 7/1999 | Kim | 379/88.33 |
| 5,968,110 A | 10/1999 | Westrope et al. | |
| 6,917,922 B1 | 7/2005 | Bezos et al. | |
| 6,985,905 B2 | 1/2006 | Prompt et al. | 707/829 |
| 7,003,722 B2 | 2/2006 | Rothchiller et al. | 715/212 |
| 2001/0011241 A1 | 8/2001 | Nemzow | 705/35 |
| 2001/0014103 A1 | 8/2001 | Burns et al. | 370/429 |
| 2002/0133510 A1 | 9/2002 | Lau | 1/1 |
| 2003/0004895 A1 | 1/2003 | Nuttall et al. | 705/67 |

(Continued)

OTHER PUBLICATIONS

Zimmermann, Olaf et al., "Service-Oriented Architecture and Business Process Choreography in an Order Management Scenario: Rationale, Concepts, Lessons Learned," OOPSLA '05, Oct. 16-20, 2005, San Diego, CA, pp. 12.

(Continued)

*Primary Examiner* — William Goodchild
(74) *Attorney, Agent, or Firm* — Campbell Stephenson LLP

(57) ABSTRACT

Various techniques for providing product configuration as a Web Service are disclosed. One method involves receiving a Web Service signature requesting access to a product configuration session to configure a product and accessing information representing an instance of the product, in response to receipt of the Web Service signature. A responsive Web Service signature, containing information such as the price of the instance of the product, whether the instance of the product represents a valid configuration, and/or indicative of options available to further configure the product, can be returned to the application that requested access to the session. The requester can request multiple changes to the instance of the product, and validation of those changes can be delayed until after all of the changes have been applied (as opposed to each change being validated independently). A single configurator can handle requests received via multiple different sales channels.

23 Claims, 6 Drawing Sheets

(56) References Cited

U.S. PATENT DOCUMENTS

| | | | |
|---|---|---|---|
| 2003/0023963 A1* | 1/2003 | Birkholz et al. | 717/172 |
| 2003/0088573 A1 | 5/2003 | Stickler | 707/100 |
| 2004/0006516 A1* | 1/2004 | Anagol-Subbarao et al. | 705/26 |
| 2004/0015443 A1 | 1/2004 | McCoy | 705/50 |
| 2004/0054603 A1 | 3/2004 | Clinesmith et al. | |
| 2004/0064351 A1* | 4/2004 | Mikurak | 705/7 |
| 2004/0133656 A1 | 7/2004 | Butterworth et al. | 709/219 |
| 2005/0044197 A1 | 2/2005 | Lai | |
| 2005/0114270 A1 | 5/2005 | Hind et al. | |
| 2005/0131759 A1 | 6/2005 | Agrawal et al. | |
| 2005/0149547 A1 | 7/2005 | Wight et al. | |
| 2005/0198394 A1 | 9/2005 | Waldorf et al. | 709/246 |
| 2006/0011720 A1 | 1/2006 | Call | |
| 2006/0122942 A1 | 6/2006 | Nuttall et al. | 705/59 |
| 2006/0136593 A1* | 6/2006 | Silky et al. | 709/227 |
| 2006/0143079 A1 | 6/2006 | Basak et al. | |
| 2006/0167988 A1* | 7/2006 | Barck et al. | 709/203 |
| 2006/0168226 A1 | 7/2006 | Miller et al. | 709/226 |
| 2006/0205420 A1 | 9/2006 | Bibr et al. | 455/466 |
| 2007/0083459 A1 | 4/2007 | Eubanks | |
| 2007/0150370 A1* | 6/2007 | Staib et al. | 705/26 |
| 2008/0133303 A1 | 6/2008 | Singh et al. | 705/35 |
| 2009/0106128 A1 | 4/2009 | Varmaraja et al. | |
| 2009/0106129 A1 | 4/2009 | Varmaraja et al. | |
| 2009/0106287 A1 | 4/2009 | Lewis | 1/1 |
| 2009/0106398 A1 | 4/2009 | Seaman | 709/219 |
| 2010/0094716 A1 | 4/2010 | Ganesan et al. | 705/26 |

OTHER PUBLICATIONS

Commercenet, Federal Agencies, Technology Vendors, and Suppliers Demonstrate New Technologies for Tying Together Independent, Proprietary Catalogs, Mar. 15, 2000, PR Newswire; http://search.proquest.com/printviewfile?accountid=14753; pp. 2-5.

* cited by examiner

WEB SERVICE ARCHITECTURE FOR PRODUCT CONFIGURATION

RELATED APPLICATIONS

This application claims the benefit, under 35 U.S.C. §119 (e), of U. S. Provisional Application No. 60/981,446, filed Oct. 19, 2007, entitled "Web Service Architecture for Order Management System," and naming Muralidhara Varmaraja, Meng Feng, Hang Lu, Ashish Singhal, Eugene Chikovani, Mark D. Lewis, Ying Wang, Re Lai, Robert A. M. Seaman, II, Jonathan Fan, and Yi Chang as inventors. The above-referenced application is hereby incorporated by reference herein in its entirety as if completely and fully set forth herein.

FIELD OF THE INVENTION

This invention relates to order management systems and, more particularly, to providing order management functionality as a service.

BACKGROUND

Order management systems provide a framework for providing functionality such as that needed to define a sales context, manage products and catalogs, generate pricing information, and analyze customer behavior. However, such order management functionality is typically integrated with the interface for accessing that functionality. Accordingly, the order management functionality is typically only accessible via static, pre-specified interfaces. For example, many order management systems provide a single interface that provides limited, if any, customizability, which may in turn limit a client's ability to control the look and feel of the user interface that client presents to customers.

Furthermore, the standard interfaces may not be available for use with certain sales channels, effectively rendering the underlying order management system functionality inaccessible to those sales channels. This can in turn require that the underlying order management system functionality be duplicated for each sales channel. In such a system, each instance of the underlying functionality must be updated whenever a change (e.g., to the products within a product line or to product pricing) is made. Since multiple different systems must be updated in order to propagate each change, there is an increased likelihood that there will be inconsistencies among the sales channels (e.g., due to the change not be entered at the same time or in the same manner in each system).

BRIEF DESCRIPTION OF THE DRAWINGS

A more complete understanding of the present invention may be acquired by referring to the following description and the accompanying drawings, in which like reference numbers indicate like features.

Figure 1:
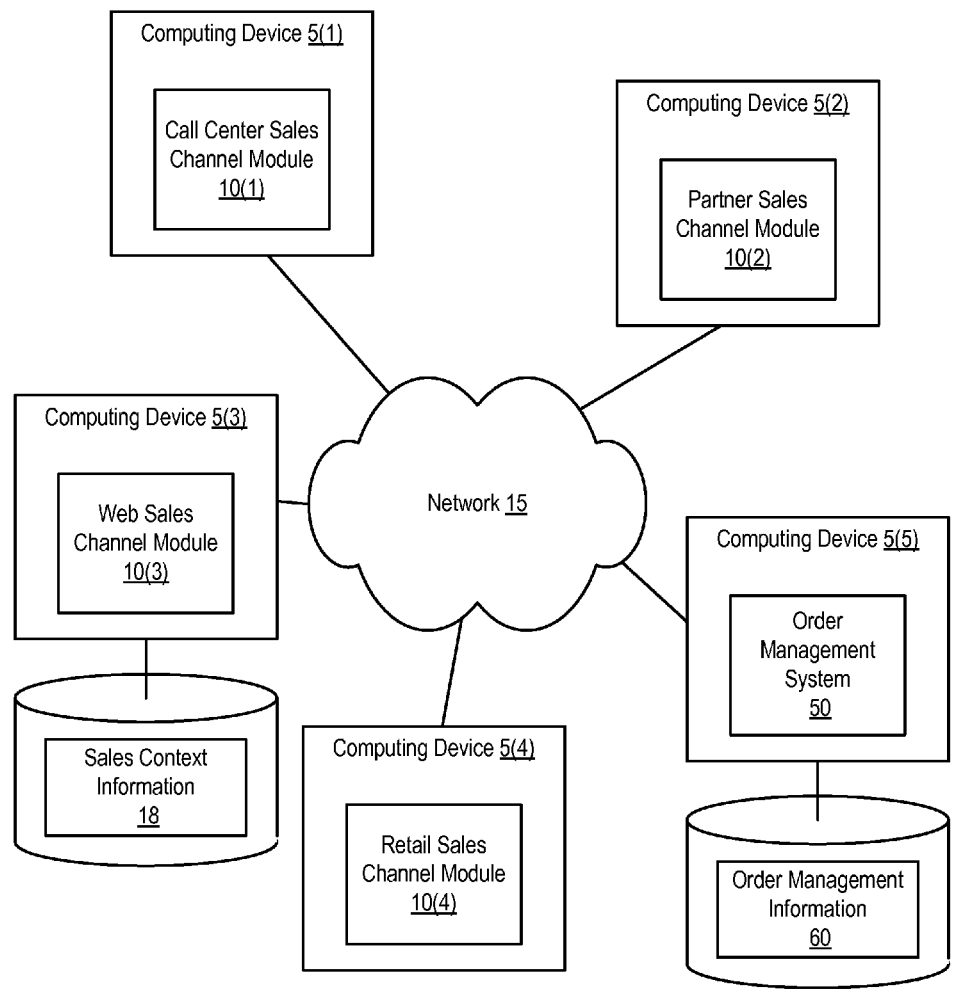
FIG. 1 is a block diagram of a system that includes an order management system that provides order management functionality as a Web Service, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

System Overview

FIG. 1 is a block diagram of a system that includes an order management system that provides various order management functions as Web Services. As shown, the system includes several computing devices 5(1), 5(2), 5(3), 5(4), and 5(5). Each computing device can include one or more servers, personal computers, cell phones, laptop computers, personal digital assistants, or other computing devices that are capable of implementing a sales channel module or order management system in hardware and/or software.

Computing device 5(5) implements an order management system 50. Order management system 50 provides functionality that can be used to, for example, define a sales context, manage product and/or catalog information, proving pricing information, and/or analyze customer behavior. Order management system 50 can also provide functionality to capture orders, orchestrate orders, and/or fulfill customer orders. While FIG. 1 shows order management system 50 being implemented on a single computing device 5(5), it is noted that in many implementations, the functionality of order management system 50 may be distributed among several such computing devices.

Order management system 50 can provide access to, generate, and/or maintain order management information 60. Order management information 60 can include pricing information, rules information (e.g., for use in determining pricing, product configurations, product eligibility, and the like), catalog and product information, and other appropriate information.

Computing devices 5(1), 5(2), 5(3), and 5(4) each implement a respective sales channel module. These sales channel modules are used to facilitate respective sales channels. In particular, call center sales channel module 10(1), which is implemented on computing device 5(1), is used to facilitate a call center sales channel. In one embodiment, call center sales channel module 10(1) provides a user interface to a customer service agent working in a call center, allowing the customer service agent to use functionality provided by order management system 50.

Similarly, computing device 5(2) implements a partner sales channel module 10(2). Partner sales channel module 10(2) can facilitate sales (via order management system 50) of one client's products and/or services by another client, which is referred to as a partner.

Computing device 5(3) implements a Web sales channel module 10(3). Web sales channel module 10(3) facilitates orders over the Internet. For example, Web sales channel module 10(3) can include a Web server that allows users to browse Web pages. Web sales channel module 10(3) can interact with order management system 50 in order to obtain information to display in the Web pages being supplied to users.

Computing device 5(4) implements a retail sales channel module 10(4). Retail sales channel module 10(4) can operate in a retail environment. Retail sales channel module 10(4) can provide sales clerks and/or customers with access to the functionality provided by order management system 50 in order to facilitate sales and ordering in the retail environment.

Computing devices 5(1)-5(5) are coupled by a network 15. Network 15 can include one or more Local Area Networks (LANs) and/or Wide Area Networks (WANs) such as the Internet. Network 15 can be implemented using various wireless links, coaxial cables, fiber optic cables, and the like. It is noted that in alternative embodiments, instead of being implemented on separate computing devices from each other and from order management system 50, one or more sales channel modules can be implemented on the same computing device as each other or on the same computing device as all or part of order management system 50.

Each sales channel module 10(1), 10(2), 10(3), and 10(4) can thus interact with order management system 50 in order to facilitate sales and orders via a particular sales channel. Sales channel modules 10(1), 10(2), 10(3), and 10(4) can be implemented in a variety of different ways, using various different types of applications. For example, call center sales channel module 10(1) can be a mainframe order entry system, while partner sales channel module 10(2) can be implemented using an application such as Siebel™ Business Applications software, available from Oracle Corporation of Redwood Shores, Calif., or Microsoft™ Sharepoint Server, available from Microsoft Corporation of Redmond, Wash. In general, each sales channel module may be implemented differently than each other sales channel module.

Each sales channel module can also maintain sales context information, such as sales context information 18 maintained by Web sales channel module 10(3). Such sales context information can include shopping cart information (e.g., for a Web sales channel), customer identifiers or other information (e.g., such as a prior order history) associated with a customer, and the like.

As briefly noted above, order management system 50 provides order management functionality as a Web Service. A Web Service is a discrete piece of business logic that is accessible via Internet protocols. Such a Web Service can be specified using Web Services Description Language (WSDL). In particular, WSDL is a format, based in eXtensible Markup Language (XML), for defining a Web Service interface. WSDL can be used to specify the endpoints, location, protocol binding, operations, parameters, and/or data types associated with a Web Service.

The organization that creates order management system 50 can generate a WSDL document (e.g., an XML document complying with WSDL) that describes the Web Service(s) provided by order management system 50. For each Web Service, the WSDL document can describe the operations provided by the Web Service, the input and output message structures for each operation, and the mechanism used to contact the Web Service.

Web Services are accessed using an XML-based transport protocol such as Service Oriented Architecture Protocol (SOAP). In particular, Web Service signatures (which are messages that comply with a particular Web Service's WSDL file) can be transported via SOAP.

Using Web Services to access order management functionality allows the order management functionality to be decoupled from the sales channel module accessing the order management functionality. Accordingly, each different sales channel module can be implemented differently (and independently), so long as the resulting sales channel modules are able to request Web Services. Accordingly, a given sales channel module can be implemented whatever technology best suits the needs of a particular sales channel. Furthermore, the technology used to implement a particular sales channel module can be modified without necessitating modifications to the underlying order management system. Similarly, the particular software modules used to implement the order management system's functionality can be modified without necessitating changes in the sales channel modules that access that functionality.

Furthermore, each sales channel module 10(1)-10(4) can access the same order management functionality by accessing the order management functionality as a Web Service. Accordingly, the same underlying business logic, workflows (e.g., formed by linking two or more business logic components together to perform a particular business task), and order management information can be used to support multiple sales channels. This allows a consistent user experience (in terms of available products, pricing, discounting, and the like) to be provided across multiple different sales channels. Furthermore, whenever changes need to be made (e.g., to reflect new products, new pricing, and the like), the changes can be made just once to the underlying order management system 50. The updated order management system 50 will then return the updated service or information to each of the different sales channels.

Figure 2:
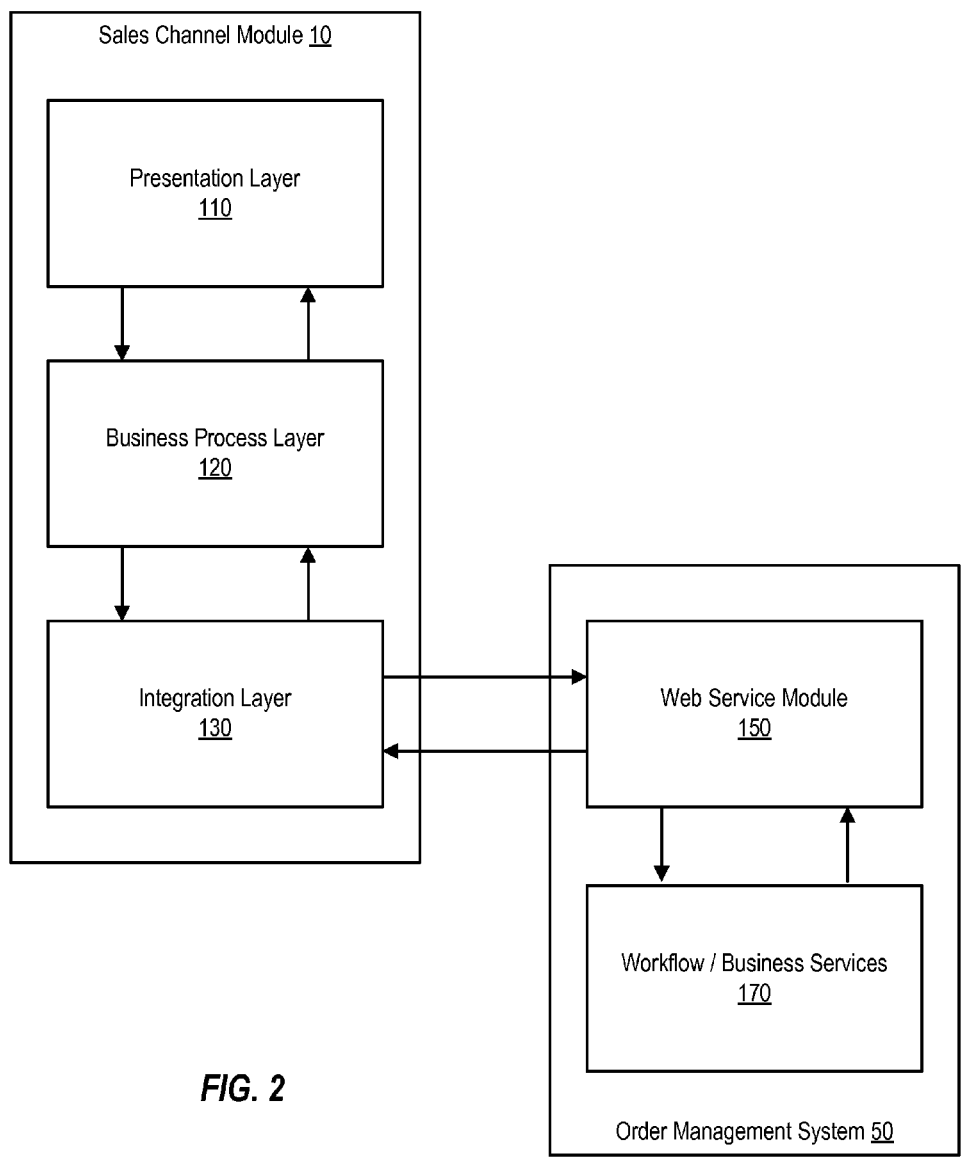
FIG. 2 is a block diagram of the Web Services interface between a sales channel module and an order management system, according to one embodiment of the present invention.

FIG. 2 is a block diagram of the Web Services interface between a sales channel module and an order management system. In this example, a sales channel module 10 (e.g., one of sales channel modules 10(1)-10(4) of FIG. 1) is coupled to communicate with an order management system 50. In one embodiment, sales channel module 10 is implemented in a container or application server (e.g., a Java 2 Platform, Enterprise Edition (J2EE)™ container), and order management system 50 can be implemented in a different container or application server.

Sales channel module 10 includes a presentation layer 110 (e.g., used to provide a user interface), a business process layer 120 (e.g., used to implement workflows or business services), and an integration layer 130. Integration layer 130 includes a Web Service requester agent that is configured to request Web Services provided by order management system 50 by sending Web Service signatures via SOAP (or any other appropriate protocol).

Order management system 50 includes a Web Service module 150, which includes a Web service provider agent that is configured to receive Web Service signatures sent by sales channel module 10 and to send responsive Web Service signatures back to sales channel module 10. Web Service module 150 can also transform Web Service signatures into property sets that can be processed by workflow and/or business services 170. Similarly, Web Service module 150 can transform property sets generated by workflow and/or business services 170 into Web Service signatures and then send those Web Service signatures to the appropriate sales channel module.

Workflow and/or business services 170 include various modules for providing workflows and business services. For example, such modules can include a module that provides a pricing workflow, a module that provides product configuration functionality, a module that provides access to catalog and product information, and the like. Workflow and/or business services 170 can operate on property sets provided by Web Service module 150, modify and/or access order management information (e.g., order management information 60 of FIG. 1), and return results (again in the form of property sets) to Web Service module 150.

Accessing Product Versioning and Configuration Functionality as a Web Service

Figure 3:
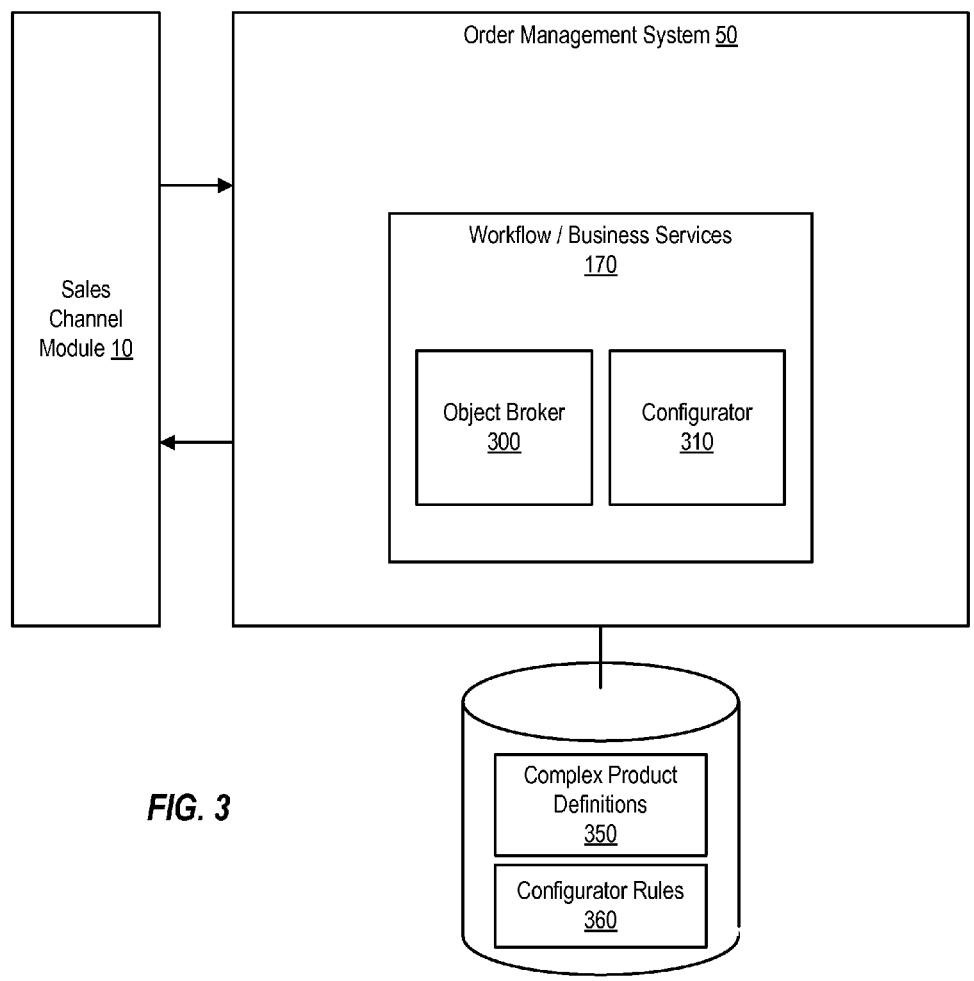
FIG. 3 is a block diagram of an order management system that provides a Web Services interface to product configuration and product versioning functionality, according to one embodiment of the present invention.

FIG. 3 is a block diagram of an order management system that provides a Web Services interface to product versioning and product configuration functionality. As shown, order management system 50 communicates with one or more sales channel modules 10 (e.g., one of sales channel modules 10(1)-10(4) of FIG. 1) via a Web Services interface. Order management system 50 includes one or more workflows and/or business services 170, which in turn include an object broker 300 that provides product versioning functionality and a configurator 310 that provides product configuration functionality. Object broker 300 and configurator 310 are configured to access various complex product definitions 350 and/or various configurator rules 360.

In response to receiving a Web Service signature requesting to invoke product versioning or product configuration functionality, order management system 50 can provide information identifying the request to either object broker 300 or configurator 310. Order management system 50 can also provide any information that was provided as part of the Web Service signature to object broker 300 or configurator 310 (e.g., such information can be provided in the form of a property set generated by a Web Services module like the one shown in FIG. 2). For example, sales context information included in the Web Service signature can be provided to object broker 300 and/or configurator 310.

Object broker 300 and configurator 310 provide functionality to sales channel modules in order to allow users to interactively configure customizable products when viewing products, ordering products, or generating a quote via a particular sales channel. Object broker 300 is configured to provide access to information describing a complex product. The sales channel module requesting this information can use the information in order to, for example, present a user with options for configuring a product. For example, if a user selects a product that has multiple options or components, the sales channel module can request information about which options and/or components are available in order to be able to present the appropriate options and/or components to the user.

Complex product definitions 350 can be stored in a format (e.g., as C++ objects) that provides for inheritance from other objects, and thus the appropriate description of a product can be based upon both the object associated with the product itself and any objects from which that object is derived (i.e., objects from which that object inherits). Complex product definitions 350 can include information identifying both what components can be included in a product as well as how those components should be assembled.

Additionally, complex product definitions 350 can define multiple different versions of a product, each of which is available in a distinct time period (e.g., as identified by a beginning and/or ending effective date associated with one or more fields in a complex product definition). For example, a new version of a product can have a different set of options than an older version of a product. Both versions of the product can be defined in the same complex product definition; the options associated with the new version can be associated with the effective date of the new version, while the options associated with the older version can be associated with the effective date of the older version.

Complex product definitions 350 can be modified at any time, and thus object broker 300 is configured to identify and use the current complex product definition when responding to each request. Additionally, new information describing a new version of a product can be added to the product's complex product definition before the effective date of the new version. This new version of the product should not be provided to sales channel modules until the effective date of the new version. Accordingly, object broker 300 is configured to identify the current version of the product, based upon the effective date(s) associated with each version, and to only return information associated with the current version.

Some of the services by object broker 300 can include a service to provide users with details regarding a product structure (e.g., such as the components that can be included within that product, the prices of those components, available quantities of those components (e.g., from inventory), the maximum and/or minimum number of each component to be included in the product, and/or options specifying which components should and/or can be included in the product at the same time). Such a service can be used to obtain details regarding a product currently being configured in an ongoing configurator session, as described below.

Another object broker service can involve allowing a user to obtain details (e.g., such as a logical user interface definition) for a group of products (e.g., a product bundle). Such details can include details of the products that can be included in the group and/or options regarding which products should and/or can be included. A similar service can be used to request the default details for such a group (e.g., listing the default products included in the group).

Configurator 310 provides the ability to configure a product via any sales channel by allowing sales channel modules to access product configuration functionality as Web Services. Such functionality includes the ability to evaluate customer choices (e.g., which can be entered via a sales channel module in response to the sales channel module displaying choices based upon information obtained from the object broker) and the ability to generate product configurations that conform to prespecified configurator rules 360.

Product configuration can be session-based, and thus configurator 310 is configured to provide the ability to begin, update, and end configuration sessions as services. Configurator 310 can maintain a cache of product definition information and instance data, for each ongoing configuration session.

The following table shows an example of functionality that can be provided by as Web Services by configurator 310, in one embodiment:

| Service | Description |
| --- | --- |
| Begin configurator session | Begin configurator session from (a) a default instance or (b) from a user-specified instance |
| Interact with configurator session | Interact with a configurator session to (a) add and/or change a quantity, (b) set an attribute, (c) determine a price, (d) verify a configuration<br>Multiple of the above interactions can be specified as a single transaction, with verification at the end |
| End configurator session | End configurator session with or without saving and/or synchronizing |

When a Web Service signature specifying the "Begin configurator session" service is received, configurator 310 establishes a new session. The session information maintained by configurator 310 for the new session can include a snapshot of the product's structure (e.g., a set of information identifying the product's allowable structure and configuration choices, as generated by invoking object broker 300), which can be maintained (e.g., in memory or another computer readable storage medium) for the duration of the session. The snapshot can be taken using the current timestamp at the time that the Begin service is invoked. All subsequent session interactions can use this snapshot.

The session can last until the "End configurator session" service is invoked, or until the Begin service is invoked again. The Begin service must be invoked prior to calling any other session service, except for the End service. If Begin service is invoked once, and then invoked again before the End service is invoked, then an End service can be implicitly invoked.

Sales context information can be included in a "Begin configurator session" Web Signature (this information can be translated into an appropriate property set, as described above, before being provided to configurator 310). The sales context can include information selected by a user prior to the user selecting to begin configuring a product. For example, if the user is configuring a product via a web sales channel, the web sales channel module can obtain the sales context from Web pages that the user accessed prior to navigation to the first configuration page of the current product being customized). If a user selects a product from a catalog and clicks a "Customize" button, for example, the Web sales channel module can generate a Web Service signature to request a quote (if not already existing), add the product as a line item to the quote, and request a Quote Row ID and Line Item Row ID from the order management system 50. These IDs can then be subsequently provided as part of sales context information included with the "Begin configurator session" Web Signature. This sales context information can be used to obtain the appropriate product structure, options, and the like.

The "Interact with a configurator session" service allows the sales channel module to modify a current instance of the product being configured by (a) adding and/or changing a quantity, (b) setting an attribute, (c) determining a price, and/or (d) verifying a configuration (e.g., based upon configurator rules 360). It is noted that multiple interactions can be specified in a single Web Service signature generated by the sales channel module. Accordingly, instead of making each change individually, configurator 310 can make several changes at once, prior to verifying that the set of changes comply with configurator rules 360. This can provide improved performance (e.g., relative to embodiments that only allow a single change at a time) in some situations. In one embodiment, instead of receiving information indicating multiple changes in a single Web Service signature, at least some changes can be request different Web Service signatures. The earlier-received Web Service signatures can include information (e.g., such as the value of a special flag or field) indicating that those changes should not be applied until one or more subsequent changes have also been requested. In response to receipt of such a request, configuration 310 can save information identifying the requested changes for later application and/or verification. The final Web Service signature, which includes the request to make and/or verify the final change in the set, can include information indicating that changes should no longer be delayed (e.g., the value of the special flag or field can indicate that all of the saved changes, plus the change requested in the current Web Service signature, should now be applied and/or verified).

The End service terminates the current session, freeing all resources associated with the session. If a runtime instance exists, then that runtime instance can be saved to a database. If the End service is invoked when there is no current session, then the End service will not perform any action.

In response to Web Service signatures requesting product configuration services, configurator 310 can generate information describing details of the current instance of the product (e.g., such as what attributes, options, component quantities, and the like are selected, as well as details indicating how components interact to satisfy the user-selected configuration), a current price of the current instance of the product, a list of options to display for further configuring the current instance of the product, and the like. In one embodiment, each time the current instance is modified, configurator 310 can return a list of options to be displayed for further selection.

Each time the Interact service is invoked, configurator 310 can return information to the requesting sales channel module that represents a complete configuration solution that complies with configurator rules 360. If the user selections provided by the sales channel module create an inappropriate configuration that violates configurator rules 360, configurator 310 can identify which of the selections create conflicts in the response. Additionally, configurator 310 can identify how to resolve the conflicts in the response. Accordingly, the Web Service signature returned to the sales channel module can include information identifying any conflicts in the user-selected configuration and/or information indicating how to resolve those conflicts. (Alternatively, instead of indicating how to resolve the conflicts, configuration 310 can simply generate information identifying an error condition).

Figure 4:
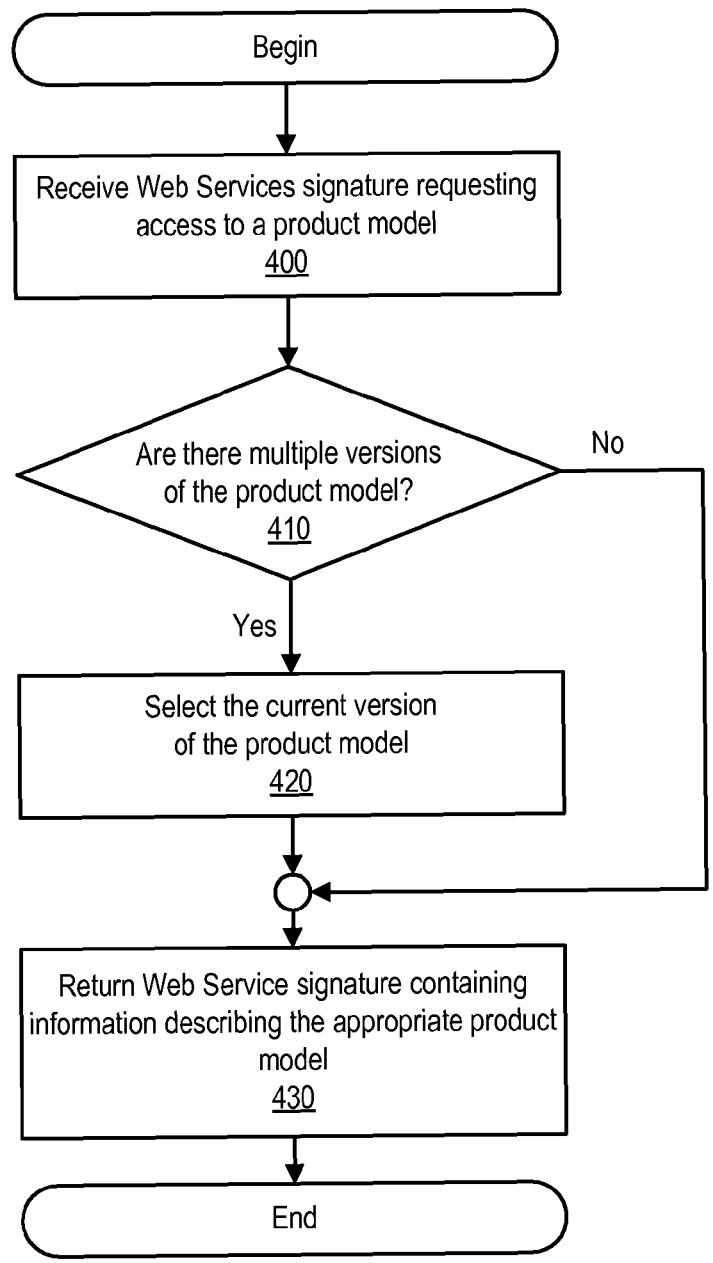
FIG. 4 is a flowchart of a method of providing product versioning functionality as a Web Service, according to one embodiment of the present invention.

FIG. 4 is a flowchart of a method of providing product versioning functionality as a Web Service. The method begins when a Web Service signature requesting access to a product model is received, as indicated at 400. At 410, a determination is made as to whether there are multiple versions of the product model. This determination can be made by searching for multiple effective dates within a product model. For example, if there are multiple sets of product options within the product model, and each set is associated with a different effective dates, a determination that there are multiple versions of the product can be made.

If there are not multiple versions, a Web Service signature containing information describing the single version of the product model can be returned, as shown at 430. If there are multiple versions of the product model, the current version of the product model is selected, as shown at 420. The current version can be selected based upon the current date as well as information identifying the effective date(s) of each version within the product model. The version whose effective date(s) include the current date can be selected as the current version. A Web Service signature containing information describing the current version of the product model can then be returned, as shown at 430. It is noted that in some situations, the request may request some, but not all, of the available product model (e.g., the request may request attributes contained in the product model, but not configuration constraints or rules), and thus the information returned at 430 may be less than all of the available information for the current version of the product model.

The current version can be selected by selecting all information within the product model that is associated with a current effective date. For example, if effective dates are specified in terms of an end date, all information that is not associated with an end date that has already passed can be part of the current version. If effective dates are specified in terms of a start date, all information that is associated with a start date that is not in the future can be part of the current version. If effective dates are specified in terms of start and/or end dates, both considerations can be used to select the information that defines the current version of the product model.

In many situations, new versions can be pre-published, such that an administrator adds a new version of a product model to the order management system prior to that version becoming available for access by users. Accordingly, selecting the current version can involve selecting among historical, current, and future versions.

Figure 5:
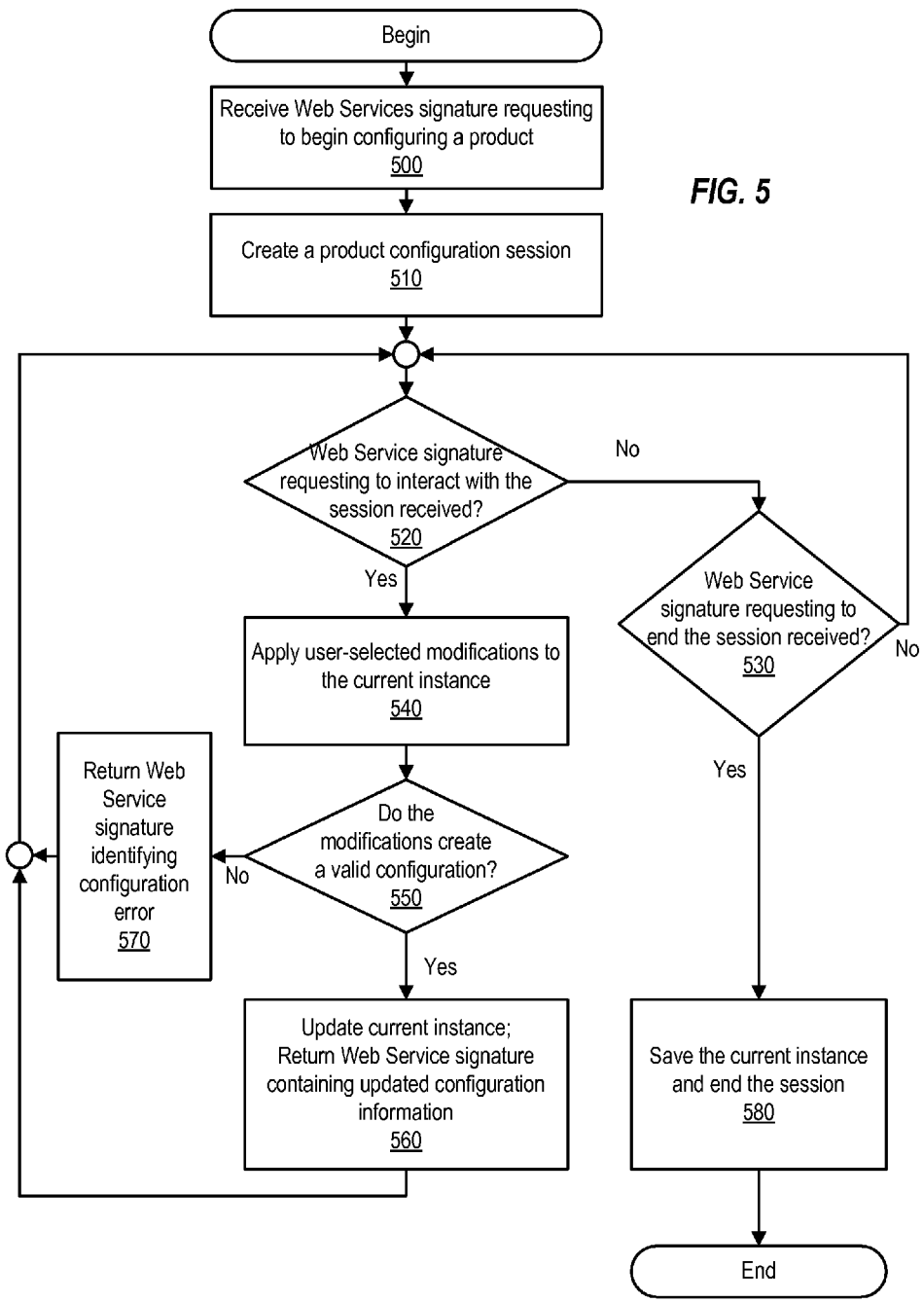
FIG. 5 is a flowchart of a method of providing product configuration functionality as a Web Service, according to one embodiment of the present invention.

FIG. 5 is a flowchart of a method of providing product configuration functionality as a Web Service. The method begins at 500, when a Web Services signature requesting to begin configuring a product (or group of products) is received. In response to receipt of this Web Services signature, a product configuration session is created, as shown at 510. Creation of the session can involve obtaining information describing a current version of a product model of the product being configured as well as creating an instance of the product. Creation of the session can be dependent upon a sales context identified in the Web Service signature (e.g., such a sales context can be used to select an appropriate version of a product model to use during configuration). In response to the Web Services signature received at 500, information identifying a set of options that a user can select to further configure the product can be returned as part of a responsive Web Service signature (not shown).

If a Web Service signature requesting to interact with the session is received at 520, modifications (indicated in the Web Service signature detected at 520) can be applied to the current instance of the product, as shown at 540. The Web Service signature (or a set of such signatures, if some of the signatures request delayed verification) detected at 520 can specify more than one modification, and all specified modifications can be applied to the current product instance prior to verifying the configuration.

If these modifications create a valid configuration (determined at 550), the modifications to the current instance can be persisted and a Web Service signature containing updated configuration information (e.g., identifying the current configuration and/or price, a new set of options to use to further configure the product, and the like) can be returned to the requester, as shown at 560. If the modifications instead create an invalid configuration, a Web Service signature identifying a configuration error (and, in some embodiments, a configuration that resolves the configuration error) can be returned to the user, as shown at 570.

At 530, a Web Service signature requesting to end the session can be detected. If such a Web service signature is received, the current product instance can be saved and the session can be ended, as shown at 580.

Figure 6:
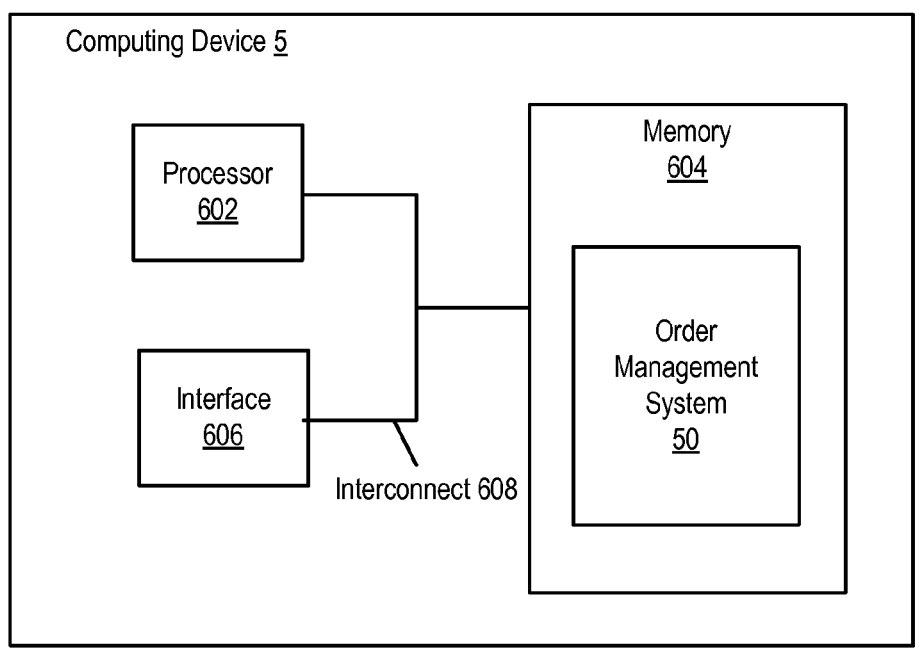
FIG. 6 is a block diagram of a computing device that illustrates how an order management system that provides a Web Services interface can be implemented in software, according to one embodiment of the present invention.

FIG. 6 is a block diagram of a computing device that illustrates how an order management system that provides a Web Services interface to product versioning and product configuration functionality can be implemented in software. FIG. 6 is a block diagram of a computing device 5 (e.g., one of computing devices 5(1)-5(5) of FIG. 1) that implements all or part of an order management system 50. While the illustrated example shows a single module executing on a single computing device, it is noted that in alternative embodiments, the functionality included within order management system 50 can be subdivided among multiple modules, each of which may be implemented on a separate computing device.

Computing device 5 can be a personal computer, network appliance, server, personal digital assistant, mobile phone, storage controller (e.g., an array controller, tape drive controller, or hard drive controller), or the like. As illustrated, computing device 5 includes one or more processors 602 (e.g., microprocessors, Programmable Logic Devices (PLDs), or Application Specific Integrated Circuits (ASICs)) configured to execute program instructions stored in memory 604. Memory 604 can include various types of RAM (Random Access Memory), Read Only Memory (ROM), Flash memory, Micro Electro-Mechanical Systems (MEMS) memory, magnetic core memory, and the like. Memory 604 can include both volatile and non-volatile memory. Computing device 5 also includes one or more interfaces 606. Processor 602, interface 606, and memory 604 are coupled to send and receive data and control signals by a bus or other interconnect.

Interface 606 can include a network interface to various networks and/or interfaces to various peripheral buses. For example, interface 606 can include a network interface via which order management system 50 sends and receives Web Service signatures. Interface 606 can also include an interface to one or more storage devices. For example, order management system 50 can access complex product definitions and/or configurator rules stored on such a storage device.

In this example, program instructions and data executable to implement all or part of order management system 50 are stored in various computer readable storage media such as memory 604. In some embodiments, such software is stored on a computer readable storage medium such as a Compact Disc (CD), Digital Versatile Disc (DVD), hard disk, optical disk, tape device, floppy disk, and the like). In order to be executed by processor 602, the instructions and data can be loaded into memory 604 from the other computer readable storage medium. The instructions and/or data can also be transferred to computing device 5 for storage in memory 604 via a network such as the Internet or upon a carrier medium.

The flowcharts provided here are provided as examples, and it is noted that other embodiments can include different operations instead of and/or in addition to those shown in the flowcharts presented herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
 (a) receiving, through a network interface of a computing device, a plurality of Web Service signatures requesting access to a product configuration session in order to apply a plurality of modifications to a plurality of instances of a product, wherein
  each instance of the plurality of instances of the product is associated with a version of the product of a plurality of versions of the product,
  the plurality of modifications are specified in a first Web Service signature of the plurality of Web Service signatures,
  the product configuration session allows a user of an application to configure the plurality of instances of the product by interacting with a product configurator, and
  the first Web Service signature is received from the application, via a first sales channel module in a first sales channel;
 (b) accessing information representing the instance of the product associated with the product configuration session in order to apply the plurality of modifications, in response to receipt of the first Web Service signature;

(c) generating, using a processor of the computing device, a second Web Service signature of the plurality of Web Service signatures, wherein the second Web Service signature comprises information indicative of options available to configure the plurality of instances of the product after the plurality of modifications have been applied;

(d) sending the second Web Service signature to the application;

(e) receiving, through the network interface, a third Web Service signature comprising user-selected modifications to the plurality of instances of the product, wherein the third Web Service signature is received from the application, via the first sales channel module in the first sales channel;

(f) verifying the configuration of the plurality of instances of the product, wherein
the verifying the configuration of the plurality of instances of the product comprises communicating with a configuration validation module, and
the configuration validation module is configured to validate the plurality of instances of the product; and (g) updating the configuration validation module with revised configurator rules, wherein
the updating is performed subsequent to the receiving the first Web Service signature,
the updating is performed prior to the receiving the second Web Service signature, and
the verifying the configuration of the plurality of instances of the product is not based on the revised configurator rules.

2. The method of claim 1, further comprising:
communicating with the configuration validation module, wherein
each of the plurality of instances is configured via a corresponding distinct sales channel.

3. The method of claim 2, further comprising:
receiving a fourth Web Service signature requesting access to a second product configuration session to configure the product, wherein the fourth Web Service signature is received from a second sales channel module in a second sales channel, distinct from the first sales channel;
accessing information representing a second instance of the product, in response to receipt of the fourth Web Service signature;
verifying the configuration of the second instance of the product, wherein the verifying the configuration of the second instance of the product comprises communicating with the configuration validation module;
generating a fifth Web Service signature, wherein the fifth Web Service signature comprises information indicative of whether the instance of the product represents a valid configuration of the product;
generating a sixth Web Service signature, wherein the sixth Web Service signature comprises information indicative of whether the second instance of the product represents a valid configuration of the product;
sending the fifth Web Service signature to the first sales channel module;
sending the sixth Web Service signature to the second sales channel module; and
updating the configuration validation module with revised configurator rules wherein
the verifying the configuration of the second instance of the product is based at least in part on the revised configurator rules.

4. The method of claim 1, wherein the accessing the information representing the instance of the product comprises: applying a plurality of changes to the instance of the product and waiting to validate the instance of the product until all of the plurality of changes have been applied.

5. The method of claim 3, further comprising:
generating the fourth Web Service signature, wherein the fourth Web Service signature comprises information indicative of whether the instance of the product represents a valid configuration of the product; and
sending the fourth Web Service signature to the application.

6. The method of claim 1, wherein the first Web Service signature comprises information representing a sales context, and wherein the accessing the information representing the instance of the product is dependent upon the sales context.

7. The method of claim 1, wherein the second Web Service signature comprises information indicative of a price of the instance of the product.

8. The method of claim 1, wherein the Web Service signature is a message that complies with a Web Services Description Language (WSDL) of a Web Service.

9. The method of claim 1, further comprising receiving the first Web Service signature and accessing the information representing the instance of the product by a computing device.

10. The method of claim 1, comprising
performing steps (a) through (g) on another version of the product of the plurality of versions of the product.

11. A non-transitory computer readable storage medium storing program instructions executable to:
access information representing a plurality of instances of a product associated with a product configuration session in order to apply a plurality of modifications, in response to receipt of a first Web Service signature of a plurality of Web Service signatures requesting access to the product configuration session in order to apply the plurality of modifications to the plurality of instances of the product, wherein
each instance of the plurality of instances of the product is associated with a version of the product of a plurality of versions of the product,
the plurality of modifications are specified in the first Web Service signature,
the product configuration session allows a user of an application to configure the instance of the product by interacting with a product configurator, and
the first Web Service signature is received from the application, via a first sales channel module in a first sales channel;
generate a second Web Service signature of the plurality of Web Service signatures, wherein
the second Web Service signature comprises information indicative of options available to configure the instance of the product after the plurality of modifications have been applied;
send the second Web Service signature to the application;
receive, through a network interface, a third Web Service signature comprising user-selected modifications to the instance of the product, wherein
the third Web Service signature is received from the application, via the first sales channel module in the first sales channel;

verify the configuration of the plurality of instances of the product, wherein
the verifying the configuration of the plurality of instances of the product comprises communicating with a configuration validation module, and
the configuration validation module is configured to validate the plurality of instances of the product; and
update the configuration validation module with revised configurator rules, wherein
the updating is performed subsequent to the receiving the first Web Service signature,
the updating is performed prior to the receiving the second Web Service signature, and
the verifying the configuration of a plurality of instances of product is not based on the revised configurator rules.

12. The computer readable storage medium of claim 11, wherein the program instructions are further configured to:
communicate with the configuration validation module, wherein
each of the plurality of instances is configured via a corresponding distinct sales channel.

13. The computer readable storage medium of claim 12, wherein the program instructions are further configured to:
access information representing a second instance of the product, in response to receipt of a fourth Web Service signature requesting access to a second product configuration session to configure the product, wherein
the fourth Web Service signature is received from a second sales channel module in a second sales channel, distinct from the first sales channel;
verify the configuration of the second instance of the product, wherein verification of the configuration of the instance of the product comprises communication with the configuration validation module;
generate a fifth Web Service signature, wherein the fifth Web Service signature comprises information indicative of whether the instance of the product represents a valid configuration of the product;
generate a sixth Web Service signature, wherein the sixth Web Service signature comprises information indicative of whether the second instance of the product represents a valid configuration of the product;
send the fifth Web Service signature to the first sales channel module; send the sixth Web Service signature to the second sales channel module; and
updating the configuration validation module with revised configurator rules, wherein the verifying the configuration of the second instance of the product is based at least in part on the revised configurator rules.

14. The computer readable storage medium of claim 11, wherein accessing the information representing the instance of the product comprises:
applying a plurality of changes to the instance of the product and waiting to validate the instance of the product until all of the plurality of changes have been applied.

15. The computer readable storage medium of claim 12, wherein the program instructions are further configured to:
generate the fourth Web Service signature, wherein the fourth Web Service signature comprises information indicative of whether the instance of the product represents a valid configuration of the product; and
send the fourth Web Service signature to the application.

16. The computer readable storage medium of claim 11, wherein the first Web Service signature comprises information representing a sales context, and wherein accessing the information representing the instance of the product is dependent upon the sales context.

17. The computer readable storage medium of claim 11, wherein the second Web Service signature comprises information indicative of a price of the instance of the product.

18. A system comprising:
non-transitory computer readable storage means for storing information representing a plurality of instances of a product associated with a product configuration session specified in a first Web Service signature of a plurality of Web Service signatures, wherein
each instance of the plurality of instances of the product is associated with a version of the product of a plurality of versions of the product,
the first Web Service signature is received from an application via a first sales channel module in a first sales channel;
configurator means for accessing, through a network interface, information representing the plurality of instances of the product associated with the product configuration session in order to apply a plurality of modifications, in response to receipt of the first Web Service signature requesting access to the product configuration session in order to apply the plurality of modifications to the plurality of instances of the product, wherein
the plurality of modifications are specified in the first Web Service signature, and wherein the product configuration session allows a user of the application to configure the plurality of instances of the product;
means for generating a second Web Service signature of the plurality of Web Service signatures, wherein
the second Web Service signature comprises information indicative of options available to configure the plurality of instances of the product after the plurality of modifications have been applied;
means for sending the second Web Service signature to the application;
means for receiving, through the network interface, a third Web Service signature comprising user-selected modifications to the plurality of instances of the product, wherein
the third Web Service signature is received from the application, via the first sales channel module in the first sales channel;
means for verifying the configuration of the plurality of instances of the product, wherein
the verifying the configuration of the plurality of instances of the product comprises communicating with a configuration validation module, and
the configuration validation module is configured to validate the plurality of instances of the product; and
means for updating the configuration validation module with revised configurator rules, wherein
the updating is performed subsequent to the receiving the first Web Service signature,
the updating is performed prior to the receiving the second Web Service signature,
the verifying the configuration of the plurality of instances of the product is not based on the revised configurator rules.

19. The system of claim 18, further comprising:
communicating with the configuration validation module, wherein
each of the plurality of instances is configured via a corresponding distinct sales channel.

20. The system of claim 18, further comprising:
means for receiving a fourth Web Service signature requesting access to a second product configuration session to configure the product, wherein
the fourth Web Service signature is received from a second sales channel module in a second sales channel, distinct from the first sales channel,
the configurator means are further for accessing information representing a second instance of the product, in response to receipt of the fourth Web Service signature, and
the means for verifying are further for verifying the configuration of the second instance of the product;
means for generating a fifth Web Service signature, wherein the fifth Web Service signature comprises information indicative of whether the instance of the product represents a valid configuration of the product;
means for generating a sixth Web Service signature, wherein the sixth Web Service signature comprises information indicative of whether the second instance of the product represents a valid configuration of the product;
means for sending the fifth Web Service signature to the first sales channel module;
means for sending the sixth Web Service signature to the second sales channel module; and
means for updating the configuration validation module with revised configurator rules, wherein the verifying the configuration of the second instance of the product is based at least in part on the revised configurator rules.

21. The system of claim 18, wherein accessing the information representing the instance of the product comprises:
applying a plurality of changes to the instance of the product and waiting to validate the instance of the product until all of the plurality of changes have been applied.

22. The system of claim 20, further comprising:
means for generating the fourth Web Service signature, wherein the fourth Web Service signature comprises information indicative of whether the instance of the product represents a valid configuration of the product; and
means for sending the fourth Web Service signature to the application.

23. The system of claim 18, wherein the Web Service signature comprises information representing a sales context, and wherein the accessing the information representing the instance of the product is dependent upon the sales context.

\* \* \* \* \*